United States Patent [19]

McClintock

[11] 4,008,566

[45] Feb. 22, 1977

[54] ELECTRONIC WATCH GENERATOR

[76] Inventor: Richard D. McClintock, 237 Washington Road, Woodbury, Conn. 06798

[22] Filed: Nov. 10, 1975

[21] Appl. No.: 630,200

[52] U.S. Cl. .......................... 58/50 R; 58/23 BA; 320/21

[51] Int. Cl.[2] .................. G04B 19/30; H01M 10/46

[58] Field of Search ............ 58/23 BA, 23 D, 28 R, 58/29, 50 R; 320/21; 322/1, 3, 4, 10, 17

[56] References Cited

UNITED STATES PATENTS

| | | | |
|---|---|---|---|
| 3,881,309 | 5/1975 | Jenni et al. | 58/50 R |
| 3,937,001 | 2/1976 | Berney | 58/23 D |
| 3,943,697 | 3/1976 | Fujita | 58/23 BA |
| 3,952,497 | 4/1976 | Schulz | 58/107 |

*Primary Examiner*—E. S. Jackmon

*Attorney, Agent, or Firm*—Hubbell, Cohen, Stiefel & Gross

[57] ABSTRACT

An electronic watch generator in which the wrist of the wearer is turned until the angle of inclination of the watch and, thus, the rotor, is sufficient to enable gravity to overcome a magnetic latching force which holds the rotor in place. The rotor is a pendulum with gravity and subsequent acceleration activating its position change to generate a voltage due to relative movement between coils located on the stator and the magnetic pole pieces on the rotor. The magnetic latching force holds the rotor against rotation until the desired angle of inclination of the wrist is sufficient to provide rapid acceleration and, accordingly, a large voltage output. The voltage generated by this action is stored in a rechargeable storage cell and is utilized to operate the watch module and display.

17 Claims, 8 Drawing Figures

ELECTRONIC WATCH GENERATOR

BACKGROUND OF THE INVENTION

1. Field of the Invention

The present invention relates to electronic watch generators.

2. Description of the Prior Art

Electronic watches, or as they are more commonly termed digital watches, are well known. Such watches normally employ a battery source, such as a silver oxide button battery cell to power the watch module and display. These prior art watches require the battery to be replaced periodically, such as annually, assuming normal use. Typical electronic watches are disclosed in U.S. Pat. Nos. 2,936,572; 3,724,200; 3,783,608 and 3,604,202. In addition, watches employing some type of magnetic control are also well known, such as disclosed in U.S. Pat. Nos. 3,816,779, 3,058,294; 3,584,454; 2,359,656 and 3,719,839, by way of example. None of these prior art systems, however, known to the present inventor, provide an efficient system in which gravity can be utilized to provide a large voltage output for continually recharging a storage cell which operates the watch module and display during normal use. These disadvantages of the prior art are overcome by the present invention.

SUMMARY OF THE INVENTION

An electronic timepiece having an electronically operated time display and a rechargeable storage means operatively connected to the display for supplying electrical power thereto is provided. The timepiece comprises a stator comprised of a magnetically permeable material, such as a soft-iron laminate, with the stator having a first coil of electrically conductive material disposed about the magnetically permeable material. A rotor is rotatably mounted in the timepiece for free rotation about the stator. The rotor has a variable angle of inclination and comprises a pendulum having an offset weight distributed therein and a first magnet mounted therein for adjacent relative movement past the first stator coil during the free rotation of the rotor for inducing a voltage in the first stator coil as a result of such relative movement. Means operatively connecting the first stator coil to the rechargeable storage means for recharging the rechargeable storage means from the induced voltage are also provided. The first magnet magnetically latches the rotor against its free rotation with respect to the stator with a predetermined magnetic latching force until the rotor angle of inclination is varied sufficiently from an initial position to enable gravity to initially overcome the magnetic latching force whereupon the rotor freely rotates about the stator from its initial magnetically latch position with an initial acceleration due to the rate of change of the angle of inclination until its movement decreases sufficiently to enable the magnetic latching force to again overcome the rotor and magnetically latch the rotor against further free rotation until the latching force is again overcome to reenable such free rotation. The induced voltage supplied to the rechargeable storage means, such as a rechargeable battery or a capacitor, as a result of such free rotation is dependent on the number of times the magnet passes the stator coil during such free rotation. The timepiece which is preferably a wristwatch, has a watchcase to which the stator is operatively connected with the rotor being rotatable within the watchcase and being mounted in the watchcase for changing the rotor angle of inclination in accordance with the change in the angle of inclination of the watchcase. The stator preferably comprises a plurality of magnetically permeable spokes extending from a central hub with a coil of electrically conductive material disposed about every other spoke. The recharging means, which preferably includes full wave rectification means, such as a diode-bridge network, connects each of the stator coils to the rechargeable storage means for recharging the rechargeable storage means. A voltage is induced in each of the stator coils as a result of the relative movement of the rotor magnet past each of the coils. The rotor preferably comprises a plurality of magnets, such as permanent magnets, which may be disposed out of phase throughout the rotor to insure that only one of the rotor magnets at a time is adjacent a stator coil for reducing the magnet latching force while maintaining a relatively high magnetic flux level, or the magnets and stator coils may each be disposed throughout the rotor in diametrically opposed pairs with respect to the center of rotation of the rotor in which instance each of the stator coil diametrically opposed pairs are electrically connected in series and only one of the diametrically opposed rotor magnet pairs is adjacent one of the diametrically opposed stator coil pairs at a time for inducing voltage therein due to the relative movement therepast.

Thus, during operation of the present invention, the wrist of the wearer is turned until the angle of inclination of the watch and, thus, the rotor, is sufficient to enable gravity to overcome the magnetic latching force which holds the rotor in place, the magnetic latching force holding the rotor against rotation until the desired angle of inclination of the wrist is sufficient to provide rapid acceleration and, accordingly, a large voltage output. This generated voltage is stored in the rechargeable storage cell and is utilized to operate the watch module and display.

DETAILED DESCRIPTION OF THE PREFERRED EMBODIMENTS

Figure 1:
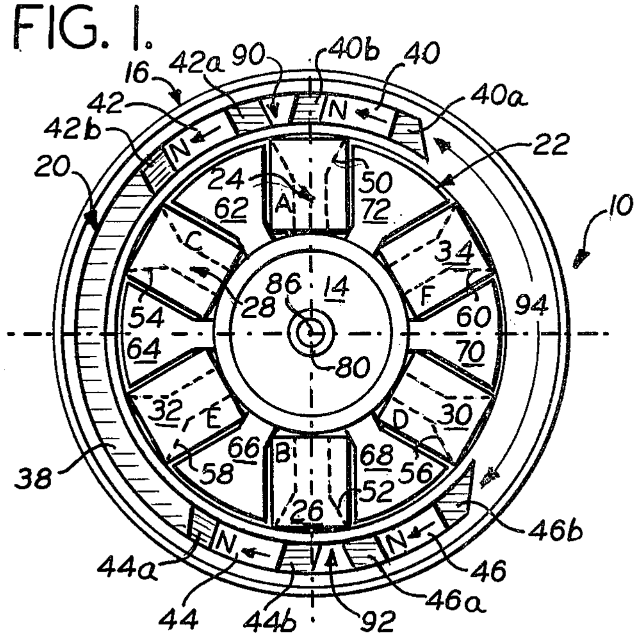
FIG. 1 is a front elevation, with the front face removed, of the presently preferred embodiment of the electronic watch of the present invention.
Figure 2:
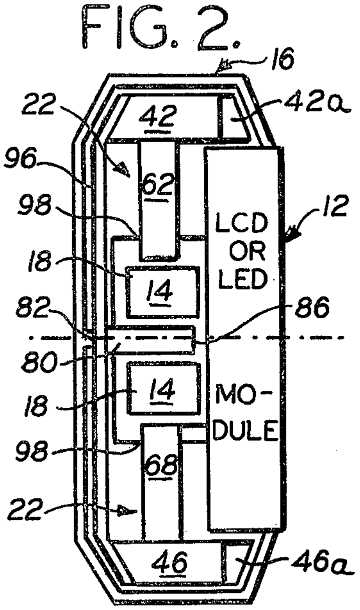
FIG. 2 is a side elevation, partly in section and partly in block, of the electronic watch shown in FIG. 1.

Referring now to the drawings in detail, and initially to FIGS. 1 and 2 thereof, the presently preferred embodiment of the electronic watch generator, generally referred to by the reference numeral 10, of the present invention is shown. As shown and preferred in FIG. 2, the electronic watch generator 10 of the present invention is preferably utilized in conjunction with a conventional standard electronic or digital watch module, generally referred to by the reference numeral 12, such as the type of watch module manufactured by Nortec Electronics Corp. under designation Nortec 5024WM-1. Such a watch module 12 contains conventional digital counting circuitry and conventional display circuitry such as for a light emitting diode display or a liguid crystal display. Since the watch module 12 is conventional it will not be described in greater detail hereinafter. Suffice it to say that such a watch module 12 is normally powered by a portable source of power such as a battery. The watch module 12 in the present invention is preferably powered by a rechargeable storage cell, such as a nickel cadmium battery, generally represented by the reference numeral 14. If desired, as will be described in greater detail hereinafter, any other type of conventional rechargeable storage cell, such as a capacitor, could be utilized with the present invention to power the watch module 12. As shown and preferred in FIGS. 1 and 2, the rechargeable storage cell 14 is preferably centrally located in the watch casing 16 with the rechargeble storage cell 14, such as a rechargeable battery, being located preferably in a storage cavity 18.

As will be described in greater detail hereinafter, the interior of the watch casing 16 also preferably includes a rotor 20 which as will be described in greater detail hereinafter, is preferably a pendulum with gravity and subsequent acceleration activating its position change to generate a voltage, and a stator, generally referred to by the reference numeral 22, about which the rotor 20 rotates so as to generate a voltage due to relative movement between coils, generally represented by the reference numerals 24, 26, 28, 30, 32 and 34 and given letters A, B, C, D, E and F, respectively, located on the stator 22, and magnetic pole pieces located on the rotor 20. The rotor 20, as was previously mentioned, is preferably a pendulum and in order to provide the pendulum effect, an off-center weight 38, such as a lead weight is preferably provided on the rotor 20. The pole pieces or magnets on the rotor 20 are preferably provided by four permanent magnets 40, 42, 44 and 46, respectively, with each of the magnets 40 through 46 being flanked by adjacent pole pieces which form part of a flux dump, magnet 40 being flanked by pole pieces *40a* and *40b*, magnet 42 being flanked by pole pieces *42a* and *42b*, magnet 44 being flanked by pole pieces *44a* and *44b*, and magnet 46 being flanked by pole pieces *46a* and *46b*. The flux dump provided by the respective pole pieces provides a place for the magnetic flux to go when a respective pole piece on the rotor 20 is over an air gap in the stator 22 and thereby reduces any resultant cogging force to manageable levels.

Figure 3:
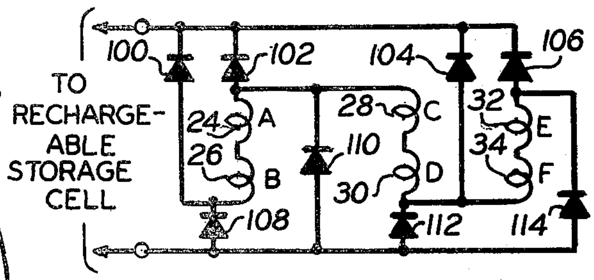
FIG. 3 is a schematic diagram of the electronic watch generator associated with the embodiment of FIG. 1.

As further shown and preferred in FIG. 1, the coils 24 through 34, respectively are each wound about an outwardly tapered spoke 50 through 60, respectively, with a substantially triangular shaped spoke on the stator 22 being provided between adjacent coils, triangular spoke 62 being provided between coils 24 and 28, triangular spoke 64 being provided between coils 28 and 32, triangular spoke 66 being provided between coils 32 and 26, triangular spoke 68 being provided between coils 26 and 30, triangular spoke 70 being provided between coils 30 and 34, and triangular spoke 72 being provided between coils 34 and 24. Each of the respective spokes 50 through 72 of the stator 22 is preferably comprised of laminated soft-iron, such as 2 V-Permandur, such as commonly utilized for transformer laminations. The coils 24 through 34 each comprise conventional electrical wire, such as No. 44 gauge wire, capable or conventionally having a. voltage induced therein due to a change in magnetic field. The outward tapering of spokes 50–60 minimizes the spacing between the tips of the respective spokes 50–60 and the adjacent stator spokes 62 and 72 for stator spoke 50, 62 and 64 for stator spoke 54, 64 and 66 for stator spoke 58, 66 and 68 for stator spoke 52, 68 and 70 for stator spoke 56, and 70 and 72 for stator spoke 60. As shown and preferred in FIG. 2, the rotor 20 is preferably freely mounted on a conventional pivot 80 in the watch casing or housing 16 on a conventional end bearing 82 for enabling such free rotation. As further shown and preferred in FIG. 1, the magnets 42 and 46 and 40 and 44 are preferably diametrically opposed across the center 86 of rotation, which is preferably also the center of the watch, which allows balancing or cancellation of potentially large forces such as bearing loads due to magnetic attraction of the rotor 20 to the stator 22. In addition, the magnets 40, 42, 44 and 46 are staggered so as to reduce the magnetic latching force while preferably enabling a pair of opposed magnets, such as 40 and 44, to be engaged at a time by a respective pair of opposed stator coils, such as 24 and 26. These opposed stator coils are preferably connected in series as shown in FIG. 3. With respect to the rotor 20, the pole pieces *42a* and *40b* are preferably spaced apart by an air gap 90 as are the pole pieces *44b* and *46a* which are spaced apart by an air gap 92. In addition, as shown and preferred, a relative large air gap 94 is provided between pole pieces *40a* and *46b*. In addition, as shown and preferred in FIG. 2, the rotor 20 preferably comprises a brass backed plate; however, if desired, soft-iron or steel may be provided on the back of the brass rotor 20, such as at 96 as illustratively shown in FIG. 2, to either act as a further flux dump or in place of flux dumps *40a, 40b, 42a, 42b, 44a, 44b, 46a, 46b*. As also shown and preferred in FIG. 2, the laminated stator 22 is preferably held together by a flange arrangement 98 provided by the casing for the rechargeable storage cell 14.

Referring now to FIG. 3, a schematic for the provision of the generated voltage as a result of the relative movement between the rotor 20 and the stator 22, as will be described in greater detail hereinafter, is shown. As is shown and preferred in FIG. 3, opposed coil pairs 24 and 26 are connected in series, opposed coil pairs 28 and 30 are connected in series, and opposed coil pairs 32 and 34 are connected in series. As is also further shown, these respective coil pairs 24–26, 28–30, and 32–34 are preferably wired in series into a Schottky diode-silicon diode-bridge so as to preferably provide full wave rectification of the generated voltage output. The silicon diodes which are utilized, four such diodes 100, 102, 104 and 106 being shown in FIG. 3, are preferably low leakage silicon diodes such as Unitrode U-108 diodes. The low forward voltage or Schottky diodes which are preferably utilized, four such diodes 108, 110, 112 and 114 being shown in FIG. 3, may be, by way of example, Hewlet Packard 5082–2835 diodes. Thus, coils 24 and 26 are series wired into a diode-bridge formed by diodes 100, 102, 108 and 110, coils 28 and 30 are series wired into a diode-bridge formed by diodes 102, 104, 110 and 112, and coils 32 and 34 are series wired into a diode-bridge formed by diodes 104, 106, 112 and 114 to provide full wave rectification of the generated voltage output through the respective coil pairs 24–26, 28–30 and 32–34.

The operation of the electronic watch generator of the present invention is as follows. The watch, which is preferably worn on the wrist, is turned during normal use by the wearer until the angle of inclination of the watch (the stator 22 being fixed to the watch casing or module 12) and thus, the rotor 20 is sufficient to enable gravity to overcome the magnetic latching force due to the action of the permanent magnets 40, 42, 44 and 46 with respect to the soft-iron stator 22, which holds the rotor 20 in place. The rotor, which is a pendulum as was previously mentioned, due to gravity and any subsequent acceleration due to the rapidity of the change in the angle of inclination of the watch and hence the rotor, changes its position by rotating within the watch module about the stator 22. This movement of the rotor magnets 40, 42, 44 and 46 past the coils 24 through 34, respectively of the stator 22 induces or generates a voltage in the coils due to this relative movement between the coils located on the stator 22 and the magnetic pole pieces 40, 42, 44 and 46 located on the rotor 20. The number of pulses generated by this relative movement is dependent on the number of poles 40, 42, 44 and 46 past by the respective coils 24 through 34 during the rotation of the rotor 20 plus the acceleration of the rotor 20 which affects the number of rotations of the rotor 20. This relative movement and the subsequent generation of the voltage as a result thereof occurs until the rotor 20 slows down sufficiently to again be overcome by the magnetic latching force between the rotor magnets 40, 42, 44 and 46 and the soft-iron stator 22. This cycle may again be repeated by changing the angle of inclination of the watch and hence the rotor 20 to once again enable gravity to overcome the magnetic latching force. Full wave rectification of this generated voltage output is, as was previously mentioned, preferably provided by the diode-bridge arrangements illustrated in FIG. 3. This generated voltage, as was also previously mentioned, is stored in a rechargeable storage cell 14 and is subsequently conventionally utilized to operate the watch module and display 12. As was also previously mentioned, the flux dumps provided enable the magnetic flux to flow therethrough when the respective pole pieces on the rotor 20 are over an air gap in the stator 22 thus reducing any resultant cogging force to manageable levels. The magnetic latching force as a result of the attraction between the magnets 40, 42, 44 and 46 on the rotor 20 to the soft-iron stator 22 is preferably selected so as to hold the rotor 20 against rotation until the desired angle of inclination of the wrist is sufficient to provide rapid acceleration and, accordingly, a large voltage output, the calibration of these values being conventionally accomplished. For example, a magnetic latching force of 13 grams will hold a rotor weighing 17.2 grams against rotation until an angle of inclination of at least 70° of the wrist is achieved and thereby provide rapid acceleration and a voltage output of 0.6 volts in the arrangement shown in FIG. 1.

Figure 6:
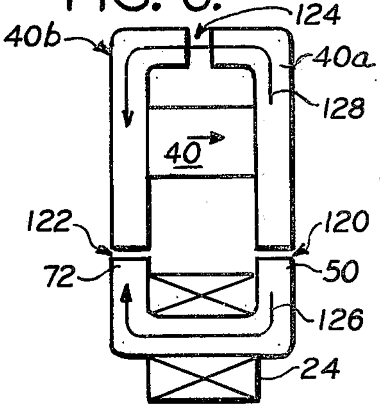
FIG. 6 is a diagrammatic illustration of a typical flux dump arrangement for a rotor pole piece in the embodiment of FIG. 1.

Referring now to FIGS. 1 and 6, a typical flux path is illustrated. The flux path extends from the magnet 40, down into and through the coil 24, through the stator spoke 72, which provides the return, through the pole piece 40*a*, and back into the magnet 40. As shown and preferred in FIG. 6, when air gaps 120 and 122 are small, most of the magnetic flux flows in the path indicated by arrow 126. However, when air gaps 120 and 122 are large due to movement of the magnet, e.g. magnet 40, then most of the magnetic flux flows in through gap 124 in the path indicated by arrow 128. Since the magnet supplies a relatively constant amount of flux to the circuit, there is a relatively small change in the potential energy of the magnet with change in position so that the cogging force is minimized.

Figure 4:
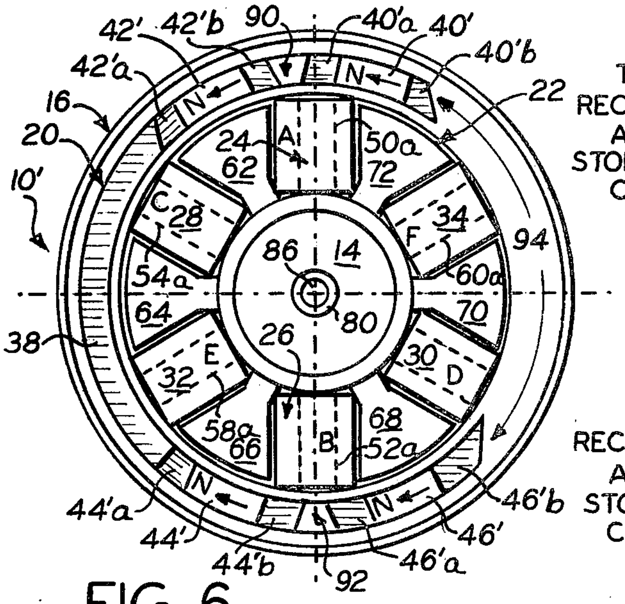
FIG. 4 is a view similar to FIG. 1 of an alternative embodiment of the electronic watch of FIG. 1.
Figure 5:
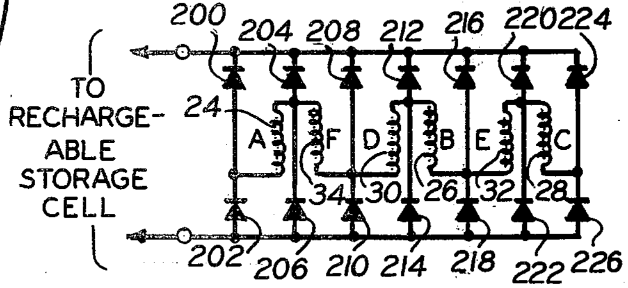
FIG. 5 is a schematic diagram of the electronic watch generator associated with the embodiment of FIG. 4.

Referring now to FIGS. 4 and 5, an alternative arrangement of the electronic watch generator illustrated in FIGS. 1 and 3 is shown. The watch generator of FIG. 4 is preferably identical with that of FIG. 1 with the exception that the magnets on the rotor 20 represented in FIG. 4 by reference numerals 40′, 42′, 44′ and 46′ are not in diametrically opposed pairs as are the magnets of FIG. 1 but rather are slightly out of such relationship so as to be engaged by the stator coils only one at a time. Thus, the magnets 40′, 42′, 44′ and 46′ are staggered so as to reduce the magnetic latching force and insure that only one pole piece on the rotor 20 is engaged at a time thereby reducing the magnetic latching force while keeping relatively high magnetic flux levels. In order to accomplish this, the magnets 40′, 42′, 44′ and 46′, as mentioned above, are slightly out of phase so that only one stator pole piece or coil 24 through 34, respectively, is engaged with a rotor 20 pole piece at a time. In addition, as shown in FIG. 4, the coils 24 through 34, respectively, are each wound about a rectangular or cylindrical spoke 50*a* through 60*a*, respectively, as opposed to the outwardly tapered spokes 50 through 60 illustrated in FIG. 1. The balance of the physical arrangement of the embodiment of FIG. 4 is preferably identical with that previously described with reference to FIG. 1 and will not be described in greater detail herein. Suffice it to say that because of the arrangement of the rotor magnets and stator coils in FIG. 4, the recharging circuit provides induced voltage form the coils one at a time as illustrated in the circuit of FIG. 5. Each of the coils 24 through 34, respectively, is individually connected into a diode-bridge circuit for providing full wave rectification with coil 24 being connected in a diode-bridge network with diodes 200, 202, 204 and 206; with coil 34 being connected in a diode-bridge network with diodes 204, 206, 208 and 210; with coil 30 being connected in a diode-bridge network with diodes 208, 210, 212 and 214; with coil 26 being connected in a diode-bridge network with diodes 212, 214, 216 and 218; with coil 32 being connected in a diode-bridge network with diodes 216, 218, 220 and 222; and with coil 28 being connected in a diode-bridge network with diodes 220, 222, 224 and 226. The functioning of the respective diode-bridge networks with respect to the coils 24 through 34, respectively, is preferably identical with that previously described with reference to the diode-bridge networks of FIG. 3 and will not be described in greater detail hereinafter. Suffice it to say that diodes 200, 204, 208, 212, 216 and 220 are preferably low leakage silicon diodes, such as Unitrode U-108 diodes and diodes 202, 206, 210, 214, 218 and 226 are preferably low forward voltage or Schottky diodes such as, by way of example, Hewlet Packard 5082–2835 diodes. These diode-bridges provide full wave rectification of the generated voltage output through the respective coils 24 through 34 which is supplied to the rechargeable storage cell 14 for recharging the rechargeable storage cell from the voltage induced in the respective coils.

Figure 7:
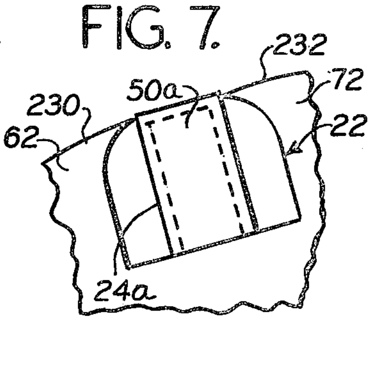
FIG. 7 is a fragmentary view of another alternative embodiment of the stator of the embodiment of FIG. 4.

Referring now to FIG. 7, a fragmentary view of an alternative arrangement for the stator 22 of the present invention is shown. The arrangement of FIG. 7 preferably reduces any resultant cogging force by the use of saturable pole tips 230 and 232 shown, by way of example, for the stator spokes which do not have a stator coil wound thereabout, such as, by way of example, in the fragmentary view of FIG. 7, stator spokes 62 and 72 which each have a pair of saturable pole tips, a typical right hand pole tip being represented by reference numeral 230 and a typical left hand pole tip being represented by reference numeral 232. In the arrangement of FIG. 7, the diameter of the coil 24*a* wrapped about stator spoke 50*a*, by way of example, is smaller than in the arrangement of FIG. 4 due to the desire to minimize the gap between the respective saturable pole tips 230 and 232 and the stator spoke 50*a* at the end adjacent to the rotor 20.

Figure 8:
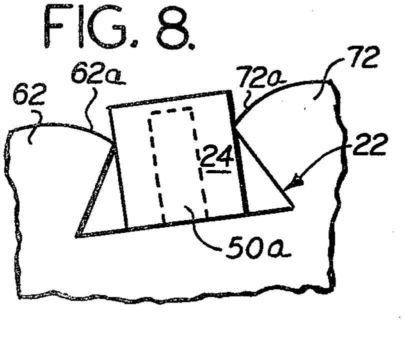
FIG. 8 is a fragmentary view of still another alternative embodiment of the stator of the embodiment of FIG. 4.

Similarly, FIG. 8 shows still another alternative to reduce cogging wherein the triangular spokes of the arrangement of FIG. 4, by way of example, are inwardly tapered at the ends adjacent the coil such as illustrated in the fragmentary view of FIG. 8 by triangular spokes 52 and 72 which are downwardly tapered at points 62*a* and 72*a* with the downward tapering preferably being symmetrical for the left hand and right hand side of the respective triangular spokes.

Apart from the minimization of cogging represented by the embodiments of FIGS. 7 and 8 in the aforementioned distinctions in the embodiment of FIGS. 4 and 5, the operation of the watch generators represented therein is otherwise preferably identical with that previously described with reference to FIG. 1 as is the balance of the structure of the electronic watch generator and will not be described in greater detail hereinafter.

By utilizing the electronic watch generator of the present invention, an electronic watch having a rechargeable storage cell may efficiently be utilized without requiring annual replacement of a battery or subsequent recharging of such a battery other than through normal use by the wearer whose normal wrist movements will subsequently recharge the storage cell to allow continued operation of the electronic watch.

What is claimed is:

1. An electronic timepiece having an electronically operated time display and a rechargeable storage means operatively connected to said display for supplying electrical power thereto, said timepiece comprising a stator comprised of a magnetically permeable material, said stator having a first coil of electrically conductive material disposed about said magnetically permeable material; a rotor rotatably mounted in said timepiece for free rotation about said stator, said rotor having a variable angle of inclination and comprising a pendulum having an offset weight distributed therein and a first magnet mounted therein for adjacent relative movement past said first stator coil during said free rotation of said rotor for inducing a voltage in said first stator coil as a result of said relative movement; and means operatively connecting said first stator coil to said rechargeable storage means for recharging said rechargeable storage means from said induced voltage; said first magnet magnetically latching said rotor against said free rotation with respect to said stator with a predetermined magnetic latching force until said rotor angle of inclination is varied sufficiently from an initial position to enable gravity to initially overcome said magnetic latching force whereupon said rotor freely rotates about said stator from its initial magnetically latched position with an initial acceleration due to the rate of change of said angle of inclination until said movement decreases sufficiently to enable said magnetic latching force to again overcome said rotor and magnetically latch said rotor against further free rotation until said latching force is again overcome to reenable said free rotation, said induced voltage supplied to said rechargeable storage means as a result of said free rotation being dependent on the number of times said first magnet passes said first stator coil during said free rotation.

2. An electronic timepiece in accordance with claim 1 wherein said timepiece is a wristwatch having a watchcase with said stator being operatively connected to said watchcase and said rotor being rotatable in said watchcase, said rotor being further mounted in said watchcase for changing said rotor angle of inclination in accordance with a change in the angle of inclination of said watchcase, whereby said magnetic latching force holds said rotor against said free rotation until the angle of inclination of said watchcase is varied sufficiently to achieve said sufficient rotor angle of inclination.

3. An electronic timepiece in accordance with claim 1 wherein said rechargeable storage means comprises a rechargeable battery.

4. An electronic timepiece in accordance with claim 1 wherein said rechargeable storage means comprises a capacitor means.

5. An electronic timepiece in accordance with claim 1 wherein said time display comprises an alphanumeric digital display.

6. An electronic timepiece in accordance with claim 1 wherein said recharging means comprises at least half-wave rectification means for rectifying said induced voltage supplied to said rechargeable storage means.

7. An electronic timepiece in accordance with claim 1 wherein said stator further comprises an air gap adjacent said first stator coil and said rotor further comprises a first magnetic flux dump means adjacent said first magnet for providing a path for magnetic flux when said rotor first magnet is over said stator air gap for reducing any potential cogging force between said rotor and said stator.

8. An electronic timepiece in accordance with claim 1 wherein said stator comprises a plurality of magnetically permeable spokes extending from a central hub with a coil of electrically conductive material disposed about every other spoke, and with said recharging means connecting each of said stator coils to said rechargeable storage means for recharging said rechargeable storage means, said voltage being induced in each of said stator coils as a result of said relative movement of said rotor first magnet past each of said coils.

9. An electronic timepiece in accordance with claim 8 wherein said rotor comprises a plurality of magnets disposed out of phase throughout said rotor to insure that only one of said rotor magnet at a time is adjacent a stator coil for reducing said magnetic latching force while maintaining a relatively high magnetic flux level.

10. An electronic timepiece in accordance with claim 8 wherein every other spoke which does not have a coil disposed thereabout is substantially triangularly shaped with said apex thereof being adjacent said hub and the triangular base extremities thereof being adjacent said coils for minimizing any air gap therebetween for reducing any potential cogging force between said rotor and said stator.

11. An electronic timepiece in accordance with claim 8 wherein said hub is at the center of rotation of said rotor, said rotor comprises a plurality of magnets disposed throughout said rotor in diametrically opposed pairs with respect to said center of rotation, said stator coils being disposed in diametrically opposed pairs with respect to said center of rotation, with each of said stator coil diametrically opposed pairs being electrically connected in series, one of said diametrically opposed rotor magnet pairs being adjacent one of said diametrically opposed stator coil pairs at a time for inducing said voltage therein due to said relative movement therepast.

12. An electronic timepiece in accordance with claim 8 wherein said recharging means comprises a rectification means for rectifying said voltage induced in each of said coils supplied to said rechargeable storage means.

13. An electronic timepiece in accordance with claim 12 wherein said rectification means comprises a diode-bridge means.

14. An electronic timepiece in accordance with claim 8 wherein said stator comprises a soft-iron laminate.

15. An electronic timepiece in accordance with claim 1 wherein said stator comprises a soft-iron laminate.

16. An electronic timepiece in accordance with claim 9 wherein said rotor magnets comprise permanent magnets and said rotor is arcuately disposed about said stator.

17. An electronic timepiece in accordance with claim 1 wherein said first rotor magnet comprises a permanent magnet and said rotor is arcuately disposed about said stator.

* * * * *